US010185739B2

(12) United States Patent
Mathew et al.

(10) Patent No.: US 10,185,739 B2
(45) Date of Patent: *Jan. 22, 2019

(54) AUTOMATIC SEARCH AND REPLACEMENT FUNCTIONALITY WITHIN A COMPUTING APPLICATION

(71) Applicant: Microsoft Technology Licensing, LLC, Redmond, WA (US)

(72) Inventors: Ashvin J. Mathew, Kirkland, WA (US); Brendan O'Meara, Bellevue, WA (US); Nicolae Surpatanu, Duvall, WA (US); Eshwar Somashekar, Seattle, WA (US); Rajat Taneja, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,286

(22) Filed: Feb. 23, 2017

(65) Prior Publication Data
US 2017/0293650 A1    Oct. 12, 2017

Related U.S. Application Data

(63) Continuation of application No. 13/207,588, filed on Aug. 11, 2011, now Pat. No. 9,619,511, which is a
(Continued)

(51) Int. Cl.
*G06F 17/30* (2006.01)
*G06Q 30/06* (2012.01)

(52) U.S. Cl.
CPC ... *G06F 17/30389* (2013.01); *G06Q 30/0635* (2013.01)

(58) Field of Classification Search
CPC combination set(s) only.
See application file for complete search history.

(56) References Cited

U.S. PATENT DOCUMENTS

| 4,536,840 A | 8/1985 | Borta |
| 5,129,082 A | 7/1992 | Tirfing et al. |

(Continued)

FOREIGN PATENT DOCUMENTS

EP    1180741    2/2002

OTHER PUBLICATIONS

Final Office Action dated Jul. 1, 2009 in related U.S. Appl. No. 11/471,834, filed Jun. 21, 2006, 20 pgs.
(Continued)

*Primary Examiner* — Farhan M Syed
(74) *Attorney, Agent, or Firm* — Christopher J. Volkmann; Kelly, Holt & Chistenson, PLLC (57) ABSTRACT

Disclosed herein is an integration of automatic search functionality into a business application. The application is monitored for an instance wherein the user is initiating an activity that involves an expenditure. Upon detection of such an activity, a query is automatically generated based on information related to the expenditure. The query is communicated to a search component, from which corresponding search results are eventually received. Finally, at least some information related to the search results is displayed to the user. In one embodiment, assuming the user's express or implicit approval, auto-generation of data and/or modification of business process flow are facilitated based on the search results.

17 Claims, 8 Drawing Sheets

Related U.S. Application Data continuation of application No. 11/471,834, filed on Jun. 21, 2006, now Pat. No. 8,024,235.

(56) References Cited

U.S. PATENT DOCUMENTS

| | | | |
|---|---|---|---|
| 5,404,507 A | 4/1995 | Bohm et al. | |
| 5,542,089 A | 7/1996 | Lindsay et al. | |
| 5,621,880 A | 4/1997 | Johnson | |
| 5,634,053 A | 5/1997 | Noble et al. | |
| 5,675,780 A | 10/1997 | Plant-Mason et al. | |
| 5,689,698 A | 11/1997 | Jones et al. | |
| 5,692,181 A | 11/1997 | Anand et al. | |
| 5,704,029 A | 12/1997 | Wright, Jr. | |
| 5,706,497 A | 1/1998 | Takahashi et al. | |
| 5,710,900 A | 1/1998 | Anand et al. | |
| 5,751,286 A | 5/1998 | Barber et al. | |
| 5,752,016 A | 5/1998 | Whittaker et al. | |
| 5,774,870 A * | 6/1998 | Storey | G06Q 20/204 705/14.27 |
| 5,778,354 A | 7/1998 | Leslie et al. | |
| 5,787,418 A | 7/1998 | Hibbetts et al. | |
| 5,787,425 A | 7/1998 | Bigus | |
| 5,787,438 A | 7/1998 | Cink et al. | |
| 5,790,677 A * | 8/1998 | Fox | G06Q 20/00 380/277 |
| 5,796,090 A | 8/1998 | Pavlidis et al. | |
| 5,796,967 A | 8/1998 | Filepp et al. | |
| 5,799,184 A | 8/1998 | Fulton et al. | |
| 5,802,515 A | 9/1998 | Adar et al. | |
| 5,826,261 A | 10/1998 | Spencer | |
| 5,953,714 A | 9/1999 | Abdullah | |
| 5,956,705 A | 9/1999 | Stevens et al. | |
| 5,956,711 A | 9/1999 | Sullivan et al. | |
| 5,960,411 A * | 9/1999 | Hartman | G06Q 10/087 705/26.8 |
| 5,978,792 A | 11/1999 | Bhargava et al. | |
| 5,987,232 A | 11/1999 | Tabuki | |
| 6,032,145 A | 2/2000 | Beall et al. | |
| 6,032,151 A | 2/2000 | Arnold et al. | |
| 6,058,373 A * | 5/2000 | Blinn | G06Q 10/087 705/22 |
| 6,065,001 A | 5/2000 | Ohkubo et al. | |
| 6,105,019 A | 8/2000 | Burrows | |
| 6,108,650 A | 8/2000 | Musk et al. | |
| 6,112,202 A | 8/2000 | Kleinberg | |
| 6,115,690 A * | 9/2000 | Wong | G06Q 10/0633 705/7.27 |
| 6,185,558 B1 | 2/2001 | Bowman et al. | |
| 6,247,021 B1 | 6/2001 | Himmel et al. | |
| 6,253,194 B1 | 6/2001 | Johnson et al. | |
| 6,266,668 B1 | 7/2001 | Vanderveldt et al. | |
| 6,292,830 B1 | 9/2001 | Taylor et al. | |
| 6,408,283 B1 | 6/2002 | Alaia et al. | |
| 6,564,213 B1 * | 5/2003 | Ortega | G06F 17/3064 |
| 6,594,644 B1 | 7/2003 | Van Dusen | |
| 6,594,692 B1 | 7/2003 | Reisman | |
| 6,766,326 B1 | 7/2004 | Cena | |
| 6,978,273 B1 | 12/2005 | Bonneau et al. | |
| 7,444,319 B1 * | 10/2008 | Sathyanarayan | G06F 17/30867 |
| 7,584,451 B2 * | 9/2009 | Iborra | G06F 8/30 717/101 |
| 7,689,580 B2 | 3/2010 | Wang et al. | |
| 7,797,678 B2 | 9/2010 | Moulckers et al. | |
| 8,024,235 B2 * | 9/2011 | Mathew | G06Q 30/0635 705/26.81 |
| 8,069,147 B2 | 11/2011 | Blazejewski et al. | |
| 8,095,431 B1 | 1/2012 | Ahluwalia | |
| 8,296,317 B2 | 10/2012 | Ghosh | |
| 8,335,778 B2 | 12/2012 | Ghosh et al. | |
| 8,812,620 B2 * | 8/2014 | Reisman | G06F 8/65 705/26.1 |
| 2002/0083092 A1 | 6/2002 | Simpson | |
| 2002/0184212 A1 * | 12/2002 | Ugai | G06Q 10/00 |
| 2003/0023626 A1 | 1/2003 | Bretti | |
| 2003/0074633 A1 | 4/2003 | Boulmakoul | |
| 2003/0115129 A1 * | 6/2003 | Feaver | G06Q 30/06 705/37 |
| 2003/0163362 A1 | 8/2003 | Lee et al. | |
| 2003/0182278 A1 | 9/2003 | Valk | |
| 2003/0200272 A1 | 10/2003 | Campise et al. | |
| 2003/0204813 A1 | 10/2003 | Krause et al. | |
| 2004/0044951 A1 | 3/2004 | Repko et al. | |
| 2004/0068658 A1 * | 4/2004 | Arisaka | G06Q 20/401 713/176 |
| 2004/0153359 A1 | 8/2004 | Ho et al. | |
| 2004/0249695 A1 | 12/2004 | Clark et al. | |
| 2005/0060647 A1 * | 3/2005 | Doan | G06F 17/30554 715/205 |
| 2005/0108022 A1 * | 5/2005 | Bhattacharya | G06Q 10/06 705/7.37 |
| 2005/0251440 A1 * | 11/2005 | Bednarek | G06Q 30/0201 705/7.32 |
| 2005/0257134 A1 | 11/2005 | Goodman et al. | |
| 2006/0031390 A1 | 2/2006 | Motoyama et al. | |
| 2006/0136309 A1 | 6/2006 | Horn et al. | |
| 2007/0089103 A1 * | 4/2007 | Iborra | G06F 8/30 717/141 |
| 2007/0226242 A1 | 9/2007 | Wang et al. | |
| 2007/0299817 A1 * | 12/2007 | Mathew | G06Q 30/0635 |
| 2008/0120240 A1 * | 5/2008 | Ginter | G06F 21/10 705/51 |
| 2009/0125546 A1 * | 5/2009 | Iborra | G06F 8/30 |
| 2010/0070496 A1 | 3/2010 | Ghosh | |
| 2010/0070517 A1 | 3/2010 | Ghosh et al. | |
| 2012/0036109 A1 | 2/2012 | Blazejewski et al. | |
| 2012/0191523 A1 * | 7/2012 | Bennett | G06Q 30/0207 705/14.23 |
| 2012/0284247 A1 | 11/2012 | Jiang et al. | |
| 2012/0330930 A1 | 12/2012 | Gorgens | |

OTHER PUBLICATIONS

Office Action dated Jan. 13, 2009 for related U.S. Appl. No. 11/471,834, filed Jun. 21, 2006, 15 pgs.

Office Action dated Oct. 16, 2009 for related U.S. Appl. No. 11/471,834, filed Jun. 21, 2008, 21 pgs.

Final Office Action dated Sep. 15, 2010 for related U.S. Appl. No. 11/471,834, filed Jun. 21, 2006, 20 pgs.

Ghiassi, M. et al. "Defining the Internet-based supply chain system for mass customized markets," Jun. 2003, Science Direct Computers and Industrial Engineering, V. 45, issue 1, pp. 17-41.

Gunasekaran, A. "A framework for supply chain performance measurement," Feb. 2004, Science Direct International Journal of Production Economics, v. 47, issue 3, pp. 333-347.

Presuitti, William. "Supply management and e-procurement: creating value added in the supply chain," Apr. 2003, Science Direct Industrial Marketing Management, vol. 32, issue 3, pp. 219-226.

Notice of Allowance dated Jun. 30, 2011 for related U.S. Appl. No. 11/471,834, filed Jun. 21, 2006, 11 pgs.

L. Jones, et al. "Avoiding the Mistake of Cloning: A Case for User-Centered Design Methods to Reengineer Documents," Proc. of 32nd Hawaii Int'l Conference on System Science, 1999, pp. 1-10.

G. Mentzas "Coordination of Joint Tasks in Organizational Processes," Published in Journal of Information Technology, v. 8, pp. 139-150.

Jensen & Scacchi, Chris & Walt. "Discovery and Analysis of Processes in Virtual Enterprises," Institute for Software Research, Aug. 2003, pp. 1-35.

Prosecution History for U.S. Appl. No. 11/471,834 including: Issue Notification dated Aug. 31, 2011, Amendment dated Oct. 29, 2010, Response to Election/Restriction dated Jun. 18, 2010, Requirement for Restriction/Election dated May 21, 2010, Amendment dated Dec. 18, 2009, Amendment dated Aug. 3, 2009, Amendment dated Apr. 13, 2009, Applicant Response to Notice to File Corrected Papers dated Sep. 18, 2006, Notice to File Corrected Papers dated Jul. 19, 2006, Application and Drawings filed Jun. 21, 2006, 106 pages.

(56) References Cited

OTHER PUBLICATIONS

"Apple Releases Safari Beta 2", bearing a date of: Apr. 11, 2003, Retrieved at: <<https://www.apple.com/newsroom/2003/04/11Apple-Releases-Safari-Beta-2/>>, Retrieved on: Jun. 29, 2017, 3 pages.
"Safari Autofill", bearing a date of: Feb. 25, 2004, Retrieved at: <<http://www.mactips.info/2004/02/safari-autofill>>, Retrieved on: Jun. 29, 2017, 5 pages.
"Safari for Mac: AutoFill preferences in Safari", bearing a date of: Mar. 30, 2017, Retrieved at: <<https://support.apple.com/kb/PH21442?locale=en>>, Retrieved on Jun. 29, 2017, 1 page.

\* cited by examiner

1 - Purchase Order

File   Edit   View   Actions   Help

Save and Close   Save and New   Receive Items

Purchase Order (Not Received)   No: 1

Vendor
Vendor name: Contoso Supplier
Phone Number
Contact name: Gregg Smith   Phone:
Vendor address: 111 1st. Ave.
City, State, 11111
US

Terms
Payment terms: 1% 10 Net 30
Shipping terms:
Shipping method: Pickup
Delivery date:

Shipping address: 1234 Main St.
Fargo, ND 32801

1/13/2004

Items and expenses

| | Name | Description | Qty. | Unit Price | Line Total | On Hand |
|---|---|---|---|---|---|---|
| | Authentic Maj. | Full Suspension Trail Bike | 10 | $825.00 | $8,250.00 | |

— 402

Total amounts:

Memo:

Reference:

Add Links...

Related Products and Services ▼ ×

Full Suspension Trail Bike $750.00
Shimano Dura-Ace TT/Tri Extra Large
Purchase Now | More details

— 406

Chrysler PT Cruiser 14" Bike $835.00
These large Dura Ace quality rings fit
Purchase Now | More details Mooneyes 26 Trail Bicycle $775.00
The choice for time trial & triathalon bikes
Purchase Now | More details

— 408

Pink Panther 26" Cruiser Bicycle $800.00
Purchase Now | More details

Sponsored Sites

Coho Sports

Variety Cycling

Fitness Department Stores

Recreational Supplies

Nearby Sporting Goods

FIG. 8

AUTOMATIC SEARCH AND REPLACEMENT FUNCTIONALITY WITHIN A COMPUTING APPLICATION

CROSS REFERENCE TO RELATED APPLICATION

The present application is a continuation of and claims priority of U.S. patent application Ser. No. 13/207,588, filed Aug. 11, 2011, which is a continuation of U.S. patent application Ser. No. 11/471,834, filed Jun. 21, 2006, the contents of these applications are hereby incorporated by reference in their entirety.

Sparked by Internet technology, there has been a dramatic proliferation of business data published and made available to users of computing devices. However, it is common for business data to be scattered across a broad range of different data stores associated with a variety of different data sources. Under the circumstances, efficiently accessing relevant data when it is needed can be a real challenge.

Currently, a user using a computing device to accomplish a business task often must stop what he or she is doing in order to manually navigate through different data stores to find a data item that is likely to be relevant to current needs. In most cases, the tools provided to support navigation through data are completely separate from the tools being utilized for business purposes. It is not uncommon for a user to be forced to switch back and forth between a business application and an application configured to support data searching.

In many cases, the process of identifying relevant business data requires a user to sift through search results (e.g., often in a list format) on a trial and error basis in order to determine relevancy of data to current needs. The queries utilized to request the search results are not commonly configured to take contextual considerations into account, such as why the user is searching for certain information or the kind of information most likely to be useful to the user performing the query. Often times, query refining becomes necessary to efficiently locate relevant results. Sometimes, re-querying using different syntax or search terms is the most efficient option. A user is often relied upon to make good and informed search strategy decisions to get to information that satisfies current needs.

The discussion above is merely provided for general background information and is not intended for use as an aid in determining the scope of the claimed subject matter. Further, the claimed subject matter is not limited to implementations that solve any or all disadvantages noted anywhere in the present description.

SUMMARY

Disclosed herein is an integration of automatic search functionality into a business application. The application is monitored for an instance wherein the user is initiating an activity that involves an expenditure. Upon detection of such an activity, a query is automatically generated based on information related to the expenditure. The query is communicated to a search component, from which corresponding search results are eventually received. Finally, at least some information related to the search results is displayed to the user. In one embodiment, assuming the user's express or implicit approval, auto-generation of data and/or modification of business process flow are facilitated based on the search results.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION

With the proliferation of business data being published on the Web and in other electronically accessible mediums, opportunities exist to integrate a business application with automatic search functionality. This functionality can then be exploited for many purposes, such as to reduce manual processing of business documents through intelligent auto-generation, and/or to intelligently modify business process flow. As will become apparent, the value of integrating search is particularly high where the search process is configured to account for contextual considerations that are customized for the user.

Figure 1:
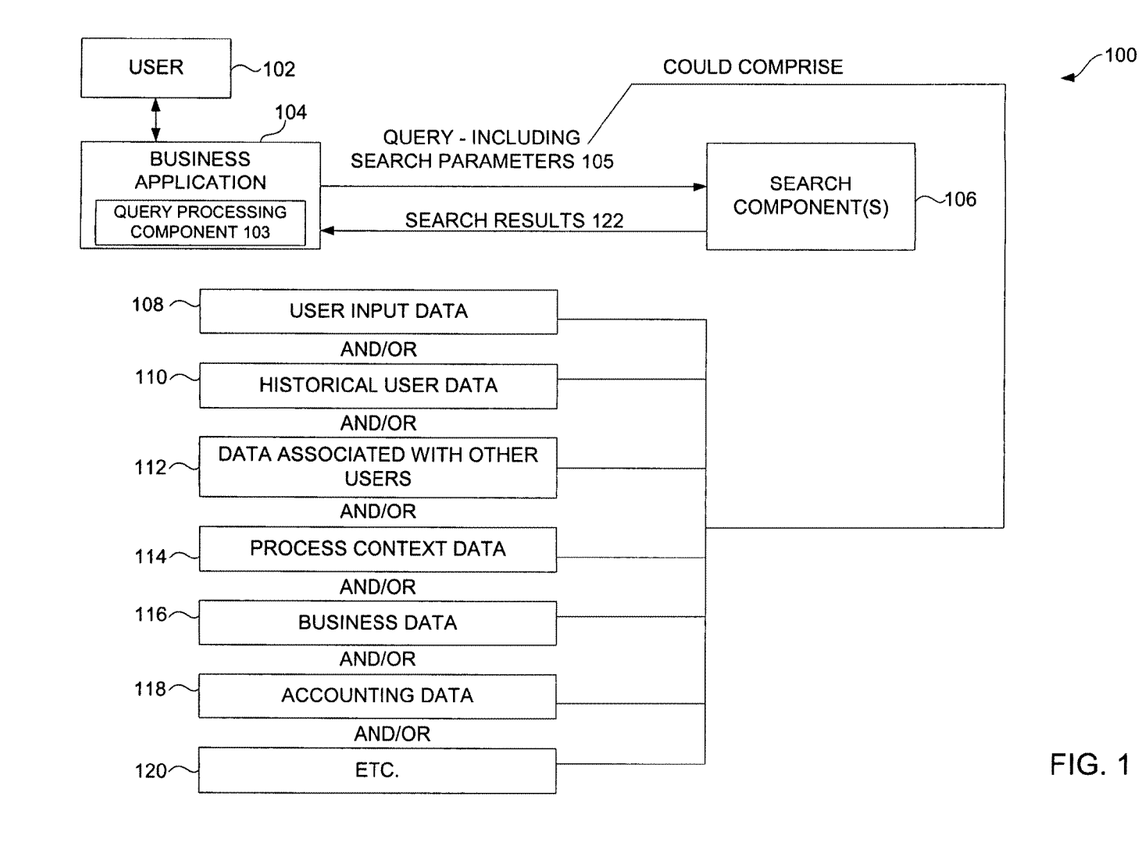
FIG. 1 is a schematic block diagram of a business application system.
Figure 2:
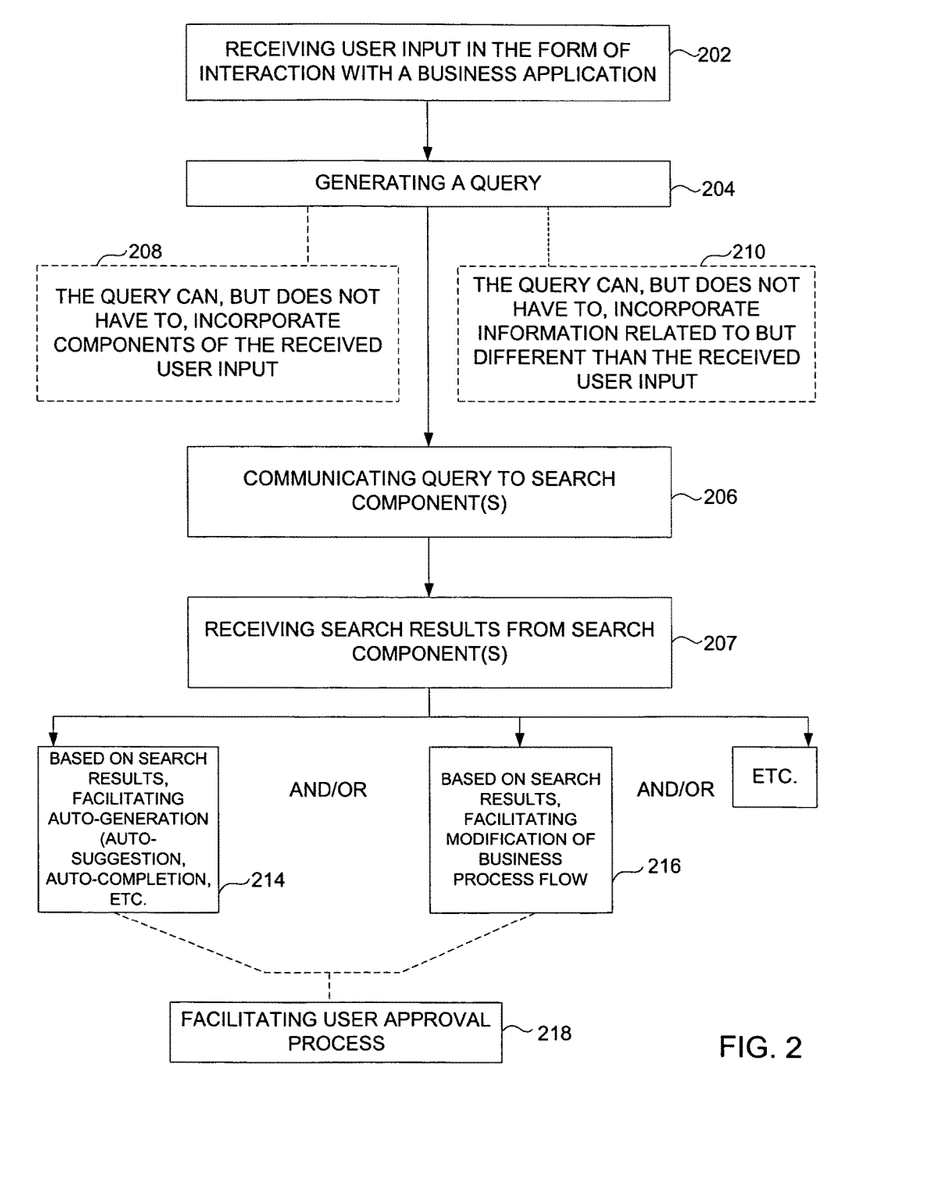
FIG. 2 is a block flow diagram demonstrating a method that can be carried out in the context of the system shown in FIG. 1.

FIG. 1 is a schematic block diagram of a business application system 100. FIG. 2 is a block flow diagram demonstrating a method that can be carried out in the context of system 100. For the purpose of illustration, FIGS. 1 and 2 will be described in conjunction with one another. It should be noted that elements from FIG. 1 have been assigned a number in the 100's and elements in FIG. 2 have been assigned a number in the 200's.

In accordance with block 202, a user 102 interacts with a business application 104. In accordance with block 204, a query is generated. This query generation step is illustratively accomplished by a query processing component 103 that may be part of application 104 but may be otherwise implemented (e.g., as part of an operating system, a service delivered over a network, etc.).

As will become apparent, the generated query is different than a traditional query based on one or more search terms input by the user specifically for the purpose of searching or querying. In fact, as is emphasized by boxes 208 and 210, the query parameters may or may not include data contemporaneously received from the user. As is indicted by block 206, the query is communicated to one or more search components 106. While the precise nature of components 106 is not critical to the present invention, in one embodiment, components 106 include one or more on-line services such as an Internet-based search engine or an advertising engine.

As is shown in FIG. 1, the communication of the query (e.g., communication initiated by application 104 or component 103) involves communicating search parameters 105. As is indicated by blocks 108 through 118, the precise nature of the query search parameters is flexible and could vary from one implementation to the next. Search parameters can include any or all of data contemporaneously input by user 102 (box 108), data input by user 102 historically (box 110), data input or associated with users other than user 102 (box 112), data related to a context in which user 102 is using application 104 (box 114), any business data associated with application 104 or another application (box 116), any accounting data associated with application 104 or another application (box 118), or any other data (box 120). An example, not by limitation, of process context that can be reflected in parameters 105 is information related the identity of a particular step in a business flow within the application. An example, not by limitation, of user input or context data that can be reflected in the parameters is contemporaneously or historically values input by the user such as SIC codes, pricing information, margin information, etc.

Search component(s) 106 process the received query based on some or all of search parameters 105. This leads to the production of search results 122, which are communicated back to business application 104. In one embodiment, a component such as query processing component 103 organizes and/or reformats search parameters 105 into certain formats desirable for certain search component(s) 106. In another embodiment, however, a searching component is configured to analyze search parameters 105 and target results accordingly (e.g., an advertising service). Box 207 represents receipt by application 104 of search results 22.

In one aspect of the present invention, search results 122 are utilized to enhance user 102's experience within application 104. This process may be handled by application 104, by query processing component 103, or by a different independent component (not illustrated). In accordance with box 214, search results 122 are utilized as a basis for providing auto-generation functionality. For example, based on the search results, fields within a display may be automatically filled in, or at least suggestions for filling in fields may be provided for user 102's acceptance or dismissal. In accordance with box 216, search results 122 are utilized as a basis for modifying the flow of a business process within application 104. For example, based on the search results, certain different forms and/or processes may be automatically implemented, or at least suggestions for different forms and/or processes may be provided for user 102's acceptance or dismissal. As is represented by box 218, some implementations may incorporate a user approval process that enables a user to accept or reject changes or proposed changes.

In one aspect of the present invention, system 100 is configured to provide great benefit to user 102 by automatically and implicitly search for information that might impact a business decision while that decision is being acted upon in application 104. Further, the searching process can be based on contextual characteristics of the decision being made (e.g., application context), data being currently input, pre-existing data, user context (e.g., user identity or role within an organization), and/or other data. In this manner, user 102 is automatically presented with choices that may be better than the current choice. Assuming implicit or explicit user consent, based on the search results, the decision itself can be changed, process flow can be changed, auto-generation can be implemented, and/or other outcomes can be triggered as appropriate for a given implementation.

Those skilled in the art will appreciate that there are many ways to implement a system in accordance the present invention and that the illustrated configuration is but one example. Further, within a given implementation, the illustrated components may have a different functionality. For example, query processing component 103 could be implemented as a data abstraction service that publishes search parameters 105 to various search services 106. In this case, the search parameters 105 illustratively include business data in a canonical format. The abstraction service can be configured to transform the canonical data format to satisfy specific format requirements for each search service. This is just one example of a similar but different implementation that should be considered within the scope of the present invention.

In order to further solidify the present description, a more specific example will now be provided. For the purpose of the example, it will be assumed that business application 104 is a small business accounting application configured to employ query processing component 103 to publish data (i.e., search parameters 105), including inventory data and contextual data, to an Internet-based data service 106. Data service 106 processes the search parameters and returns results 122 to query processing component 103. Component 103 then cooperates with application 104 in order to support an automatic alteration of a purchase order and/or a purchase order document. It should be emphasized that the present invention is not limited to the details of this one particular example.

To continue the example, it will now be assumed that the inventory data included in search parameters 105 is transmitted to search component(s) 106 in a canonical format that can include, not by limitation, any of a product name, a product description, a UPC code, price (e.g., normal and or sale), etc. In addition to these types of product information, the business application 104 may also have extensive information about business location and contact information (e.g., e-mail, fax, phone, etc.). Depending on implementation details, the published inventory data can also be tagged with this and other information. The search component(s) 106 to which data is transmitted can include, not by limitation, online search engines, comparison shopping engines, advertising networks, marketplaces, etc.

Figure 3:
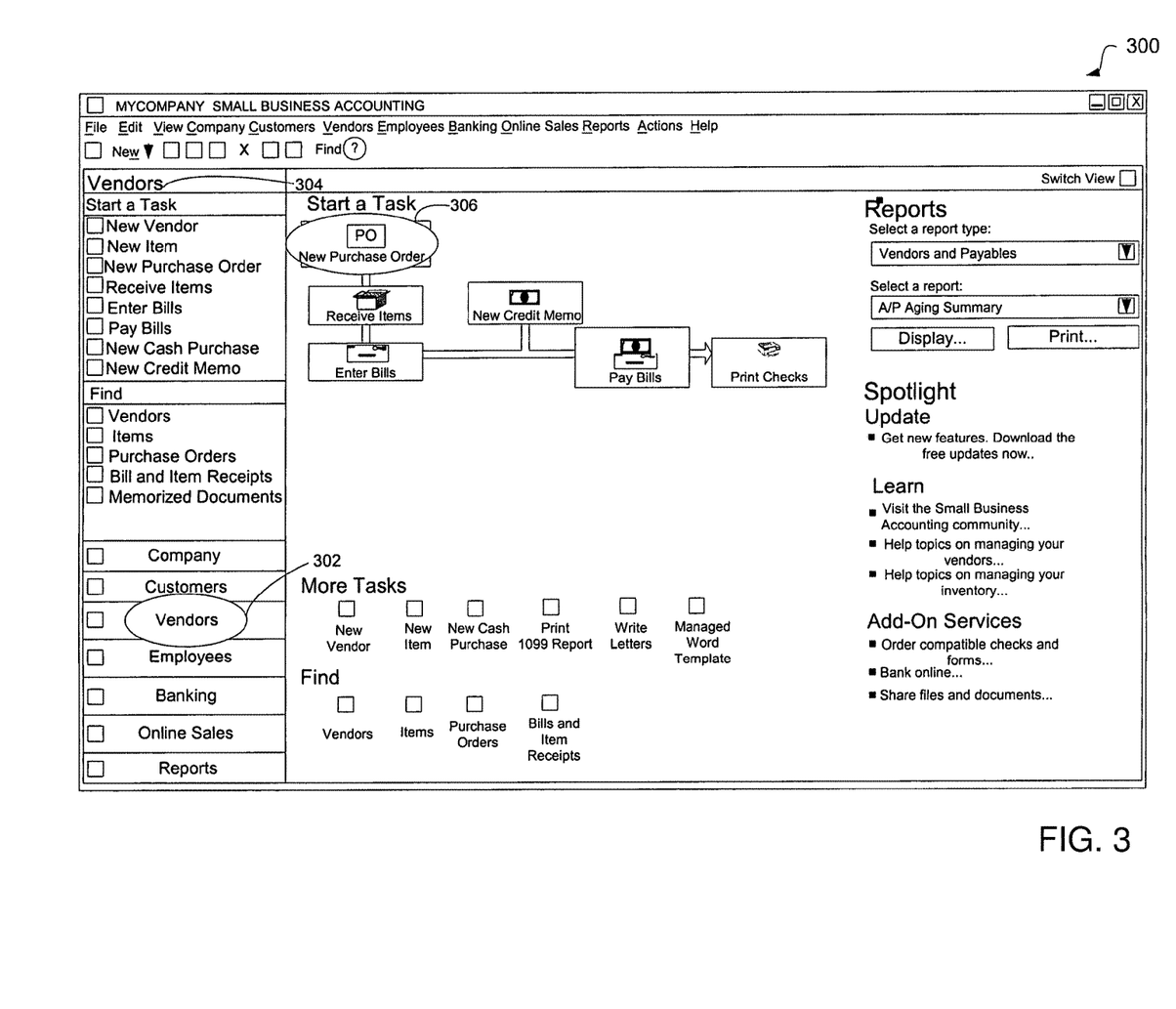
FIGS. 3-6 are examples of screenshots associated with a small business accounting software application.

Continuing with the example, FIG. 3 is an example of a screenshot 300 associated with a small business accounting software application. As is indicated by title bar 304, the application is currently in a mode related to business interactions with vendors. Oval 302 demonstrates that this mode may have been entered into following selection of a vendor tab. As is indicated by oval 306, the user next selects a "new purchase order" function associated with a display element.

Figure 4:
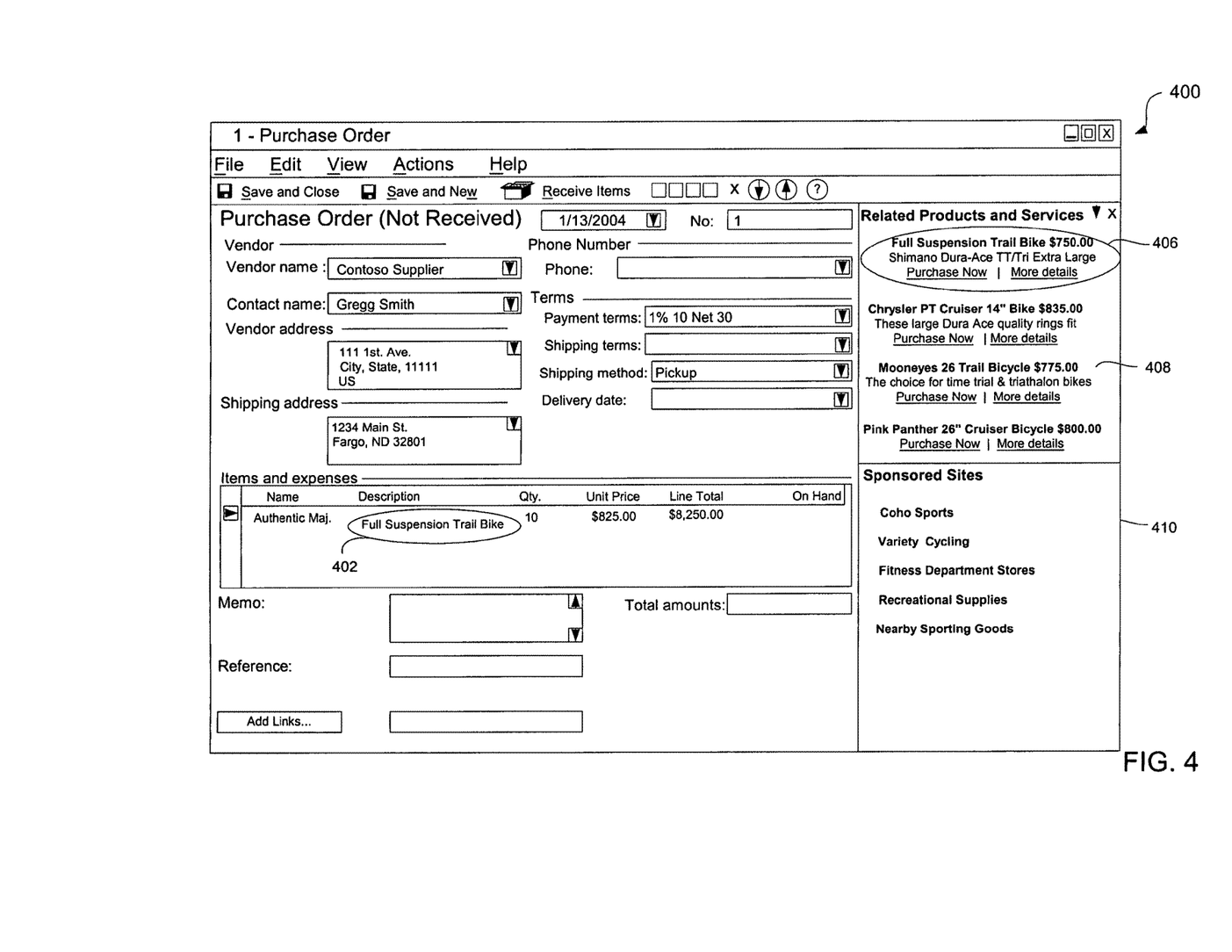

FIG. 4 is an example of a screenshot 400 associated with the small business accounting software application. Screenshot 400 is illustratively where the user arrives after selecting the "new purchase order" function as noted in relation to FIG. 3. The business function related to screenshot 400 is creation of a new purchase order. In that regard, the user enters information into the noted fields as necessary to support creation of a new purchase order.

In screenshot 400, the user is entering in a purchase order from a vendor noted as "Contoso Supplier." As is indicated by oval 402, the order is to purchase trail bikes. The user has entered a quantity of 10 at a list price of $825 per bike. As has been described herein, while the user interacts with the application so as to participate in the process of creating a purchase order, a searching process is carried out behind the scenes.

More specifically, an automatic context-sensitive search is carried out without requiring the user's attention to be switched to facilitating the search. The search is conducted based on indirectly derived search parameters such as, but not limited to, the information that the user has entered into the various fields, application context (e.g., purchase order context) or any appropriate business data (e.g., price, vendor, number of units, historic price range for same product, delivery date, details as to historical purchases, market data, etc.). Some of the search parameters may effect where the search is directed to (e.g., different searches may be directed to different searching components based on different application context indications, or searches may be limited to entities that can guarantee delivery by a certain date, etc.). Of course, some search parameters will be utilized as search query terms to be applied by the searching component.

Panels 408 and 410 contain indications of the results of a search carried out by a searching component. Panel 408 shows products and services from different venders that are the same or similar to the target of the purchase order. In this case, as is indicated by oval 406, the search produced an indication that the same bike is available from a different vendor for a lower price. Panel 410 shows alternate vendors (e.g., for the same product) that were encountered as a result of the searching process.

Figure 5:
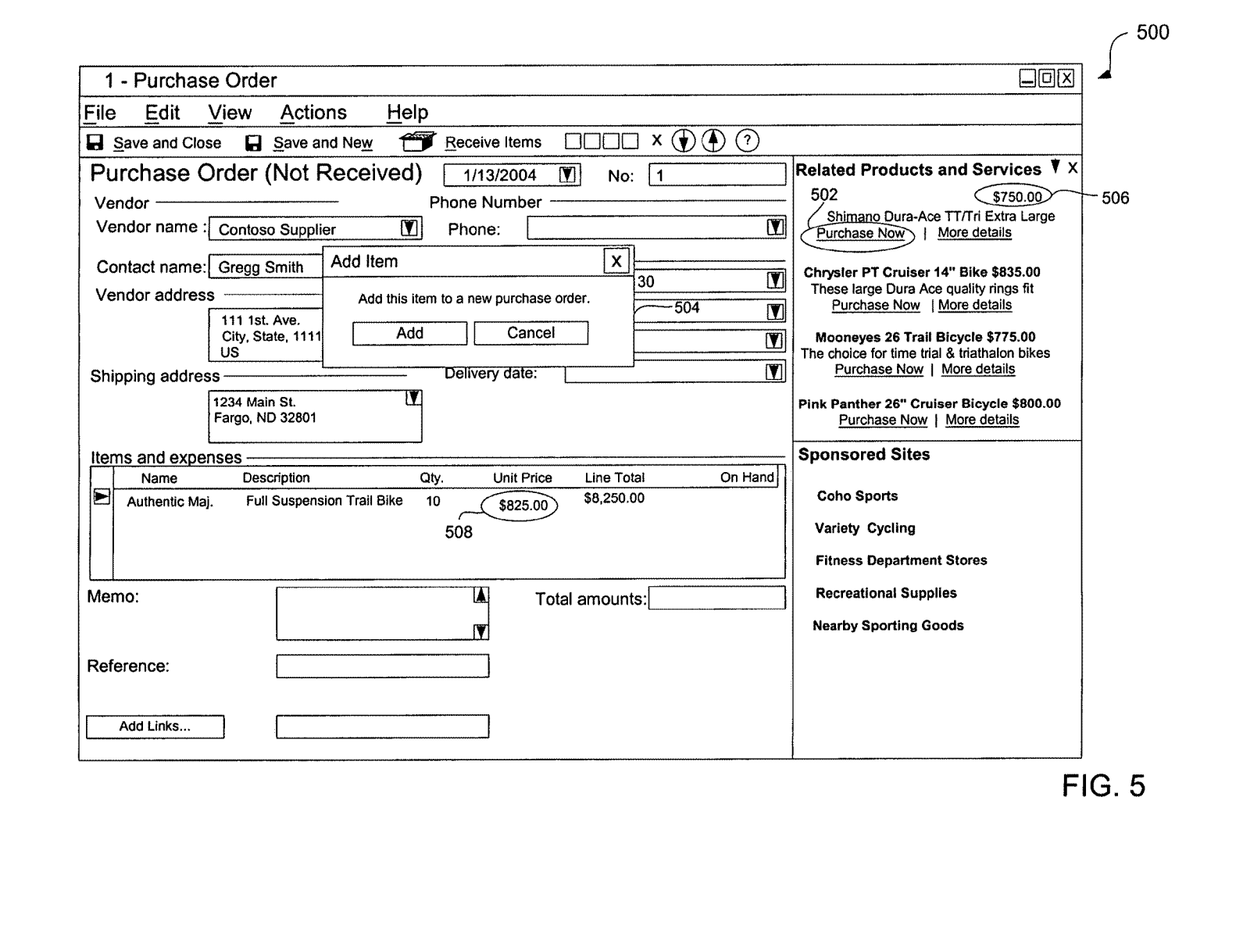

FIG. 5 is an example of a screenshot 500 associated with the small business accounting software application. The illustratively notices that the price in oval 506 is lower than the price in oval 508. Interested in the product associated with price 506, the user selects the "purchase now" option identified with oval 502. This causes pop-up box 504 to appear. Box 504 gives the user the option of canceling the current purchase order and starting a new purchase order for the product associated with price 506.

Figure 6:
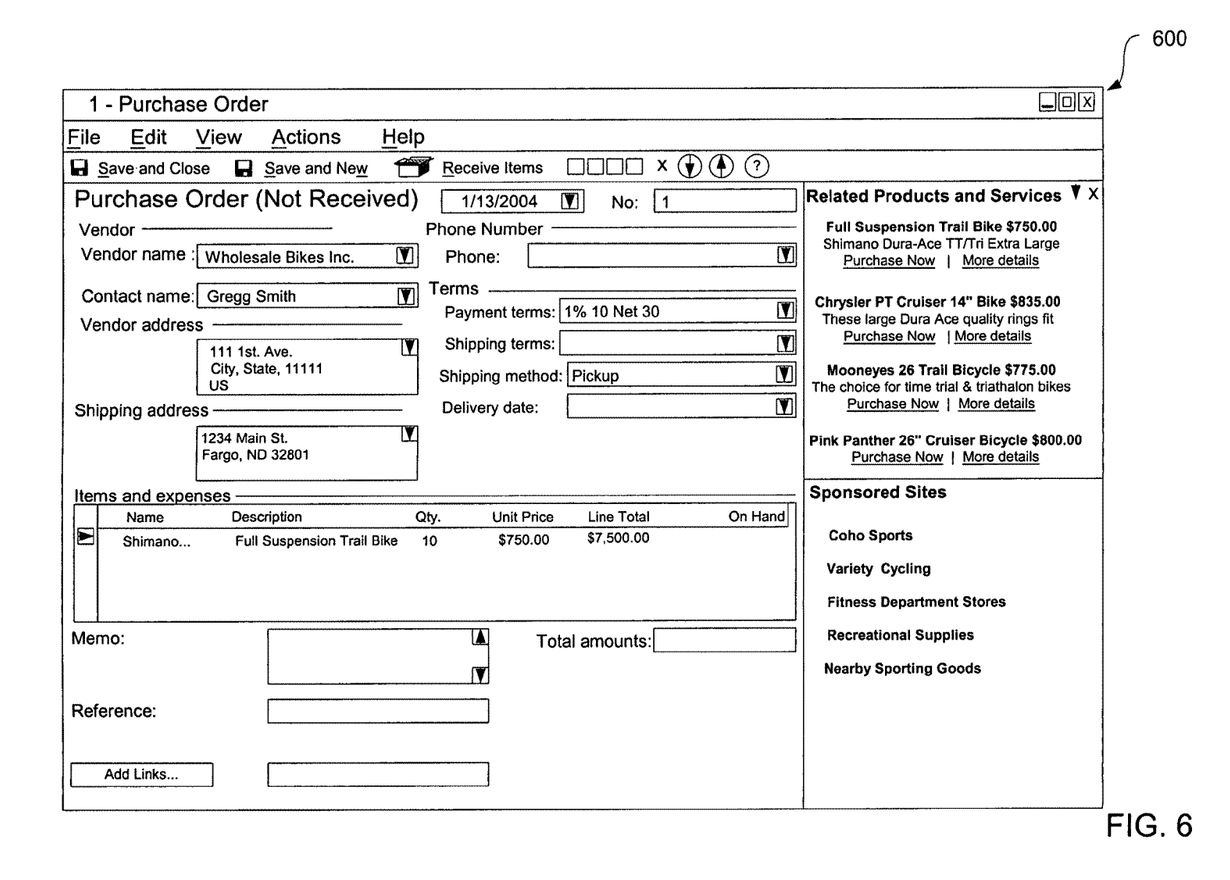

FIG. 6 is an example of a screenshot 600 associated with the small business accounting software application. Screenshot 600 is the new purchase order created after the user selects "add" from pop-up box 504. In one embodiment, one or more fields of the new purchase order are filled in automatically. For example, the vendor, product, price, etc. are filled in automatically when the user has approved the change in process flow. The new purchase order is illustratively communicated to the alternate supplier electronically, or using other methods of communication (e.g., fax, mail, etc.).

Thus, when the user creates a purchase order for an items or items (e.g., a trail bike) targeted at an existing supplier, query processing component 103 illustratively aggregates appropriate search parameters 105 and communicates them to an appropriate searching component(s). In particular, component 103 queries search engines, comparison shopping engines, and/or marketplace engines for better price matches or alternate items. This search is done in the context of the application (e.g., without leaving the application, e.g., not in an Internet browser application).

Further, the searching process can be leveraged to account for some level of understanding of the relevant business process (e.g., creating a purchase order inherently is a purchase with certain parameters like item, quantity, price delivery date, etc . . . all of which can be utilized as a basis for query). In one embodiment, the searching process is executed against a subset of all available search/information providers (e.g., appropriate comparison search engines and appropriate marketplaces) with searching qualified by attributes relevant to the business process (e.g., item/UPC, description, item attributes, cost, delivery capacity, etc.) automatically. Thus, the user need not explicitly use information to search or initiate the search. The search is automatically done on behalf of the user. On completion of the search, the positive results (e.g., in the illustrated case, items that are similar with lower prices, better availability dates, etc.) are presented to the user within the context of the business process.

It should again be emphasized that the present invention is in no way limited to a purchase order context. This is but one example of an implementation of how the described integrated search features can be implemented. Those skilled in the art will appreciate that the same or similar concepts can be applied in many other scenarios without departing from the scope of the present invention.

Thus, the present subject matter deals with an integration of automatic, context-based search functionality into business applications. Two illustrative applicable computing devices will now be described.

Figure 7:
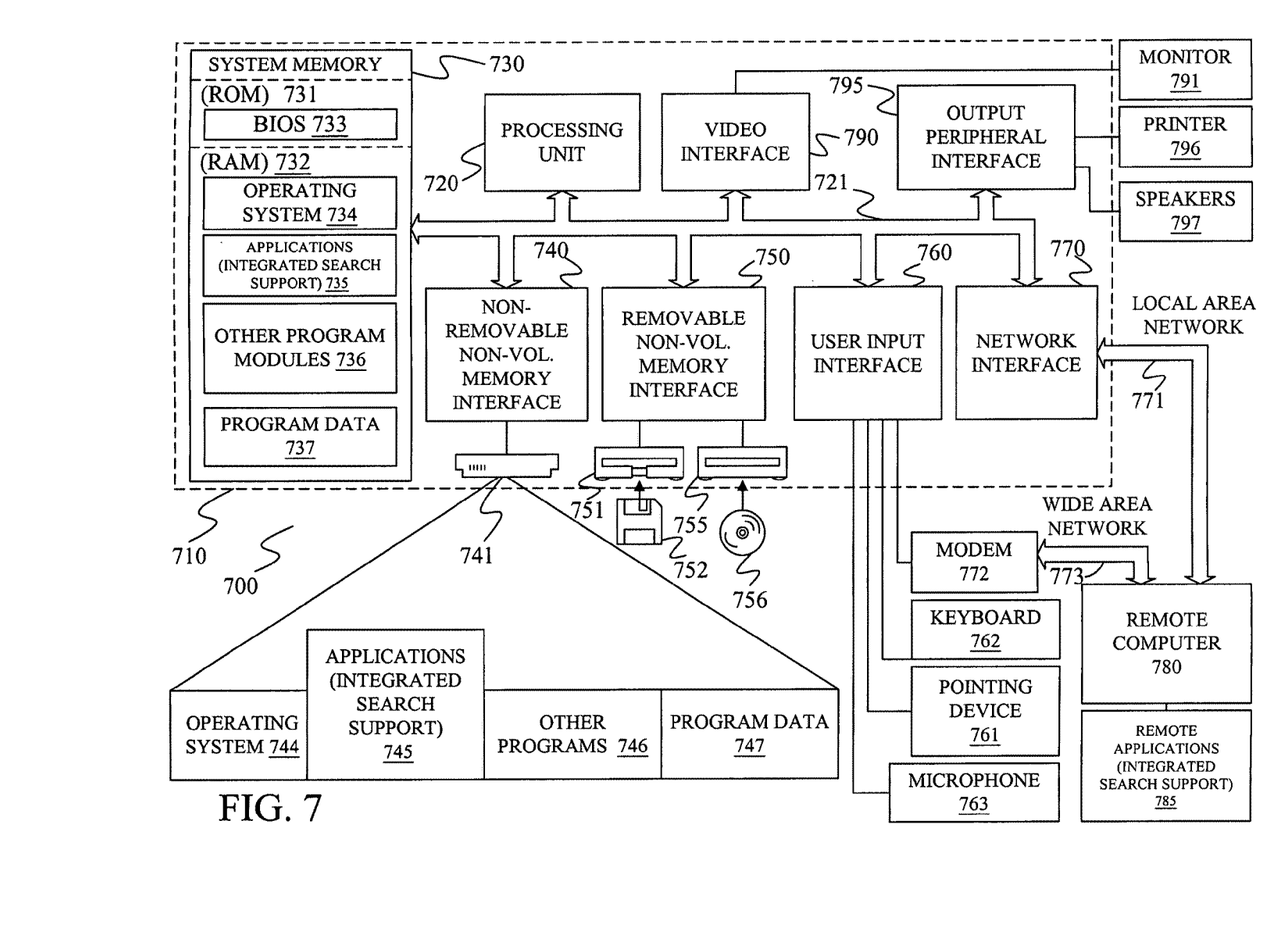
FIG. 7 is a diagrammatic representation of a computing system environment.

FIG. 7 illustrates an example of a suitable computing system environment 700 in which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described herein in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. Programs 735 are illustrated to demonstrate that at least one program can be configured to support business integrated search functionality as described herein. This need not necessarily be the case for any or all of the programs. Further, the support can be implemented from outside of the actual application. Further, programs 736 can also or alternatively be so configured.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. Programs 745 are illustrated to demonstrate that at least one program can be configured to support integrated search functionality as described herein. This need not necessarily be the case for any or all of the programs. Further, programs 746 can also or alternatively be so configured. Also, the functionality can be implemented from outside of the actual application despite being depicted as internal.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used. Programs 785 are illustrated to indicate that at least one program supports integrated search functionality as described herein. This need not necessarily be the case for any or all of the programs. Also, the functionality can be implemented from outside of the actual application despite the internal location in the Figure. In one embodiment, computer 780 is a server device containing a search component for supporting the server-side functionality of the integrated search functionality described herein.

Figure 8:
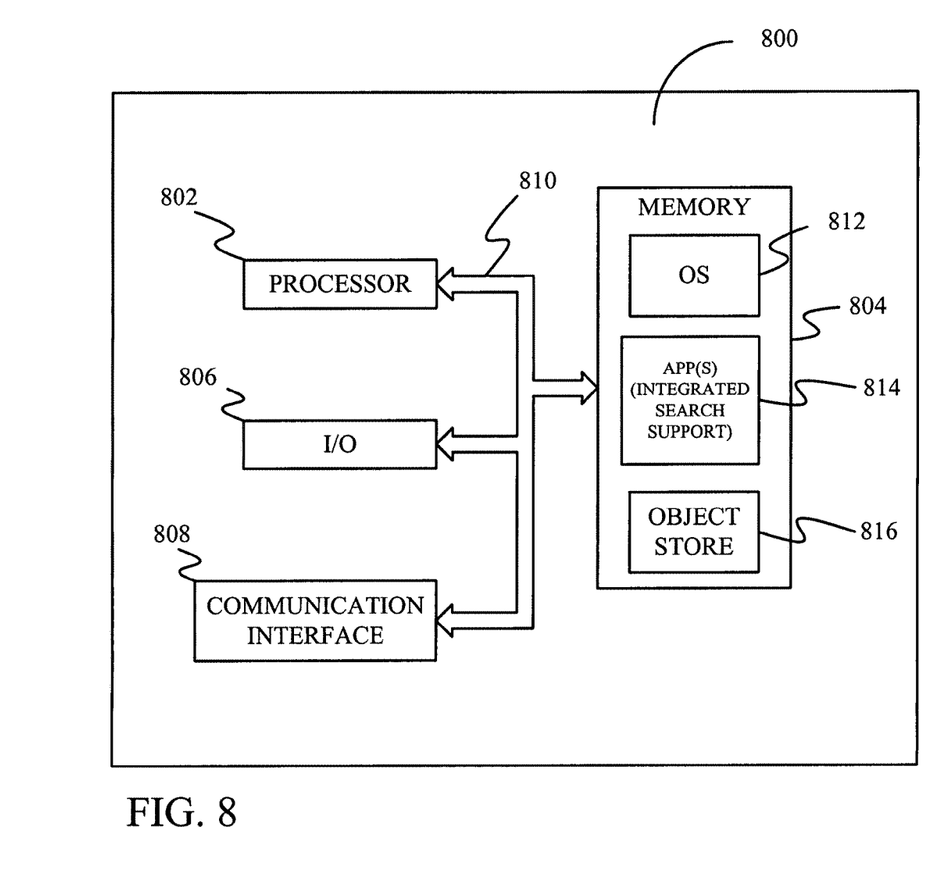
FIG. 8 is a diagrammatic representation of a mobile device environment.

FIG. 8 is a block diagram of a mobile device 800, which is an exemplary computing environment. Mobile device 800 includes a microprocessor 802, memory 804, input/output (I/O) components 806, and a communication interface 808 for communicating with remote computers or other mobile devices. In one embodiment, the afore-mentioned components are coupled for communication with one another over a suitable bus 810.

Memory 804 is implemented as non-volatile electronic memory such as random access memory (RAM) with a battery back-up module (not shown) such that information stored in memory 804 is not lost when the general power to mobile device 800 is shut down. A portion of memory 804 is illustratively allocated as addressable memory for program execution, while another portion of memory 804 is illustratively used for storage, such as to simulate storage on a disk drive.

Memory 804 includes an operating system 812, application programs 814 as well as an object store 816. Programs 814 are illustrated to indicate that at least one program supports the integrated search functionality described herein. This need not necessarily be the case for any or all of the programs. During operation, operating system 812 is illustratively executed by processor 802 from memory 804. Operating system 812 is illustratively designed for mobile devices, and implements database features that can be utilized by applications 814 through a set of exposed application programming interfaces and methods. The objects in object store 816 are maintained by applications 814 and operating system 812, at least partially in response to calls to the exposed application programming interfaces and methods.

Communication interface 808 represents numerous devices and technologies that allow mobile device 800 to send and receive information. The devices include wired and wireless modems, satellite receivers and broadcast tuners to name a few. Mobile device 800 can also be directly connected to a computer to exchange data therewith. In such cases, communication interface 808 can be an infrared transceiver or a serial or parallel communication connection, all of which are capable of transmitting streaming information.

Input/output components 806 include a variety of input devices such as a touch-sensitive screen, buttons, rollers, and a microphone as well as a variety of output devices including an audio generator, a vibrating device, and a display. The devices listed above are by way of example and need not all be present on mobile device 800. In addition, other input/output devices may be attached to or found with mobile device 800.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the processor, wherein the instructions, when executed, configure the computing system to:
generate a representation of a user interface display that represents a form associated with an application, wherein the form includes a plurality of fields, each field being
associated with a transaction parameter associated with the application, and
configured to receive an indication of user input to define the associated transaction parameter;
receive a first value through a first field of the plurality of fields;
obtain a search result based on the first value;
generate a representation of a search result display that includes the search result;
receive a selection input through the search result display that indicates the search result;
based on the indication of the search result,
automatically identify a second value associated with the search result; and
automatically select a second field of the plurality of fields, the second field being separate from the first field; and
automatically modify the representation of the user interface display by replacing the first value in the first field with the second value, and
modifying the second field to include a third value based on the search result.

2. The computing system of claim 1, wherein the first value comprises a non-numerical term.

3. The computing system of claim 1, wherein the second value comprises a non-numerical term.

4. The computing system of claim 1, wherein the second field is identified based on a type of the content of the search result.

5. The computing system of claim 1, wherein the instructions, when executed, configure the computing system to:
prior to replacing the first value with the second value,
generate a representation of an approval user input mechanism; and
receive an indication of user actuation of the approval user input mechanism, wherein the first value is replaced with the second value in response to the indication of user actuation of the approval user input mechanism.

6. The computing system of claim 1, wherein the instructions, when executed, configure the computing system to:
identify a predefined context that is not entered by the user contemporaneously with the user interface display, wherein the search result is based on the predefined context.

7. The computing system of claim 6, wherein the predefined context comprises a user context associated with the user.

8. The computing system of claim 7, wherein the user context comprises a user role associated with the user.

9. The computing system of claim 6, wherein the predefined context comprises an application context indicative of a particular workflow step associated with the application.

10. A computer-implemented method comprising:
generating a representation of a user interface display that represents a form associated with an application, wherein the form includes a plurality of fields, each field being
associated with a transaction parameter associated with the application, and
configured to receive an indication of user input to define the associated transaction parameter;

receiving a first value through a first field of the plurality of fields;

obtaining a search result based on the first value;

generating a representation of a search result display that indicates the search result;

receiving a selection input through the search result display that indicates the search result;

based on the indication of the search result,
  automatically identifying a second value associated with the search result; and
  automatically select a second field of the plurality of fields, the second field being separate, from the first field;

automatically modifying the representation of the user interface display by
  replacing the first value in the first field with the second value, and
  modifying the second field to include a third value based on the search result.

11. The computer-implemented method of claim 10, wherein the first value comprises a non-numerical term.

12. The computer-implemented method of claim 10, wherein the second value comprises a non-numerical term.

13. The computer-implemented method of claim 10, and further comprising:

prior to replacing the first value with the second value,
  generate a representation of an approval user input mechanism; and
  receive an indication of user actuation of the approval user input mechanism, wherein the first value is replaced with the second value in response to the indication of user actuation of the approval user input mechanism.

14. The computer-implemented method of claim 10, and further comprising:
  identify a predefined context that is not entered by the user contemporaneously with the user interface display, wherein the search result is based on the predefined context.

15. The computer-implemented method of claim 14, wherein the predefined context comprises an application context indicative of a particular workflow step associated with the application.

16. The computer-implemented method of claim 14, wherein the predefined context comprises a user context associated with the user.

17. The computer-implemented method of claim 16, wherein the user context comprises a user role associated with the user.

* * * * *